United States Patent [19]

Baric et al.

[11] Patent Number: 4,652,418

[45] Date of Patent: Mar. 24, 1987

[54] PLUG TESTING AND REMOVAL TOOL

[75] Inventors: Thomas J. Baric, Trafford; Charles E. Kauric, Manor, both of Pa.; Carl N. Garcia, Glendale Heights, Ill.

[73] Assignee: Westinghouse Electric Corp., Pittsburgh, Pa.

[21] Appl. No.: 670,775

[22] Filed: Nov. 13, 1984

[51] Int. Cl.⁴ .................... G21C 17/00; G21C 19/04
[52] U.S. Cl. ............................. 376/245; 376/204; 376/260
[58] Field of Search ................ 376/203, 204, 245, 260

[56] References Cited

U.S. PATENT DOCUMENTS

| | | | |
|---|---|---|---|
| 4,436,692 | 3/1984 | Stenabaugh | 376/204 |
| 4,470,946 | 9/1984 | Kassalotti et al. | 376/204 |
| 4,519,519 | 5/1985 | Meuschke et al. | 376/204 |
| 4,548,783 | 10/1985 | Dalke et al. | 376/204 |
| 4,576,778 | 3/1986 | Ferree et al. | 376/203 |

Primary Examiner—Salvatore Cangialosi
Attorney, Agent, or Firm—L. A. DePaul

[57] ABSTRACT

A tool is insertable in the narrow annular access space between the cylindrical core barrel and the thermal shield of a nuclear reactor for testing and removing a plug from a flow hole in the core barrel. The tool includes two hydraulically driven jaws which have gripping flanges receivable in a peripheral groove in the plug head for gripping same. The jaws are thin platelike members and each carries two short pistons having a length less than the thickness of the jaws and hydraulically extendable into engagement with the core barrel for exerting on the jaws and the gripped plug a predetermined force in a plug-removing direction. The jaws are preferably substantially coplanar and carried by a flat arm with the plane of the jaws disposed at a slight angle to the plane of the arm, which angle is selectively variable. Means are provided for pivotally moving the arm about an axis substantially parallel to the axis of the plug.

20 Claims, 18 Drawing Figures

PLUG TESTING AND REMOVAL TOOL

BACKGROUND OF THE INVENTION

1. Field of the Invention

The present invention relates to an apparatus for testing the tightness of the seating of a plug in a hole and removing inadequately secured plugs. The invention has application to plugs disposed in limited access locations wherein there are severe constraints on movement in the plug-removing direction. The invention has particular application to the testing and removal of upflow conversion plugs in thermal shield nuclear plants.

2. Description of the Prior Art

In a nuclear reactor the core assembly is disposed within a cylindrical core barrel and, more particularly, is confined within a zig-zag array of baffle plates which are spaced inwardly from the core barrel side wall. The space between the baffle plates and the core barrel side wall is closed by a plurality of vertically spaced-apart former plates.

In a typical "downflow" cooling arrangement, cooling water is pumped downwardly along the outside of the core barrel, the water flowing through a plurality of circumferentially spaced-apart flow holes in the core barrel disposed just below the top former plate, into the region between the core barrel side wall and the baffle plates. This latter flow then passes down through holes in the former plates and beneath the lower end of the baffle plates into the core region to join with water flowing up into the core region through holes in the bottom of the core barrel. In this "downflow" arrangement, there is high pressure water on the outside of the baffle plates and low pressure water on the inside, due to pressure loss during the travel through the fuel core assembly. The baffle plates are simply a series of bolted-together plates and the high pressure water on the outside of these plates causes jet streams to flow through cracks between the baffle plates into the core, which can damage the fuel assemblies.

In order to correct this problem, there is performed what is known as an "upflow conversion" on the reactor. In this conversion process the flow holes in the core barrel side wall are plugged with expandable plugs, and holes are drilled in the top former plate. Thus, the cooling water can no longer enter through the flow holes in the core barrel side wall. Rather it flows down along the outside of the core barrel, up through the holes in the bottom of the core barrel and then under the baffle plates and then upwardly through the region between the baffle plates and the core barrel side wall, exiting through the new holes in the top former plate, this upflowing water being under much lower pressure than the downflowing water.

Occasionally it becomes necessary to test the flow hole plugs to see if they have been properly installed so as to withstand a radial pull-out force of 6,000 lbs. (approximately equivalent to a pressure of 1,750 psig applied to the plug from within the core barrel). This presents a problem in nuclear reactors with thermal shields, which are cylindrical structures surrounding the core barrel side wall coaxially therewith. Typically, the thermal shield is spaced radially outwardly from the core barrel a very slight distance of approximately 1.5 inches, and the only access to the flow hole plugs is downwardly through this narrow annular space. Heretofore, there have been no means available for gaining access to the flow hole plugs through this narrow annular space and exerting on the plugs the necessary pull-out force.

SUMMARY OF THE INVENTION

It is a general object of the present invention to provide a unique apparatus for testing and removing flow hole plugs from the core barrel walls of thermal shield nuclear reactors, which apparatus avoids the disadvantages of prior techniques while affording additional structural and operating advantages.

An important object of the invention is the provision of an apparatus of the type set forth, which is dimensioned to be received and operated in the narrow annular space between the core barrel and the thermal shield of the reactor.

Another object of the invention is the provision of apparatus of the type set forth which includes movable jaws for gripping the plug head.

Still another object of the invention is the provision of apparatus of the type set forth which, despite very thin dimensions, can effect complete removal of improperly-installed flow hole plugs.

These and other objects of the invention are attained by providing apparatus for testing and removing a plug from an aperture in the cylindrical core barrel wall of a nuclear reactor, wherein the plug has an enlarged head disposed along the wall in a narrow annular access space between the wall and a surrounding cylindrical thermal shield, said apparatus comprising: gripping means receivable in the access space for gripping the plug head, and tensioning means coupled to the gripping means and receivable therewith in the access space and engageable with the core barrel wall for exerting on the gripping means and the gripped plug a predetermined force in a direction radially outwardly of the core barrel wall, the gripping means and the tensioning means having dimensions radially of the wall substantially less than the radial thickness of the access space.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Referring to FIGS. 1-4, there is illustrated a nuclear reactor vessel, generally designated by the numeral 20, provided with a coolant conduit 21 for passing cooling water from an associated source (not shown) into the interior of the reactor vessel 20, in the direction of the arrows 22. Disposed coaxially within the reactor vessel 20 is a core barrel 23 having a cylindrical side wall 24 and a circular bottom wall 25. The side wall 24 has a plurality of circumferentially spaced-apart inlet apertures or flow holes 26 toward the upper end thereof and the bottom wall 25 has a plurality of inlet apertures 27 therein. The core barrel 23 is provided at its upper end with a radially outwardly extending annular flange 28, to which is secured a circular top wall 29 which closes the core barrel 23 at its upper end.

Disposed within the core barrel 23 is a fuel core assembly 30 (FIG. 4) of known construction which is confined between a lower core plate 31 and an upper core plate 32 and is peripherally enclosed within a baffle 33, comprising a plurality of interconnected rectangular baffle plates 34 arranged in a zig-zag array with each baffle plate 34 being disposed substantially perpendicular to adjacent baffle plates 34. The baffle 33 is spaced inwardly from the core barrel side wall 24. The lower core plate 31 has a plurality of holes 35 therein to permit passage of cooling water therethrough. The space between the baffle 33 and the core barrel side wall 24 is closed at the upper ends thereof by a top former plate 36 and therebelow by a plurality of vertically spaced-apart lower former plates 37. Each of the lower former plates 37 is provided with a plurality of circumferentially spaced-apart flow holes 38 therethrough.

Figures 1, 2, 3:
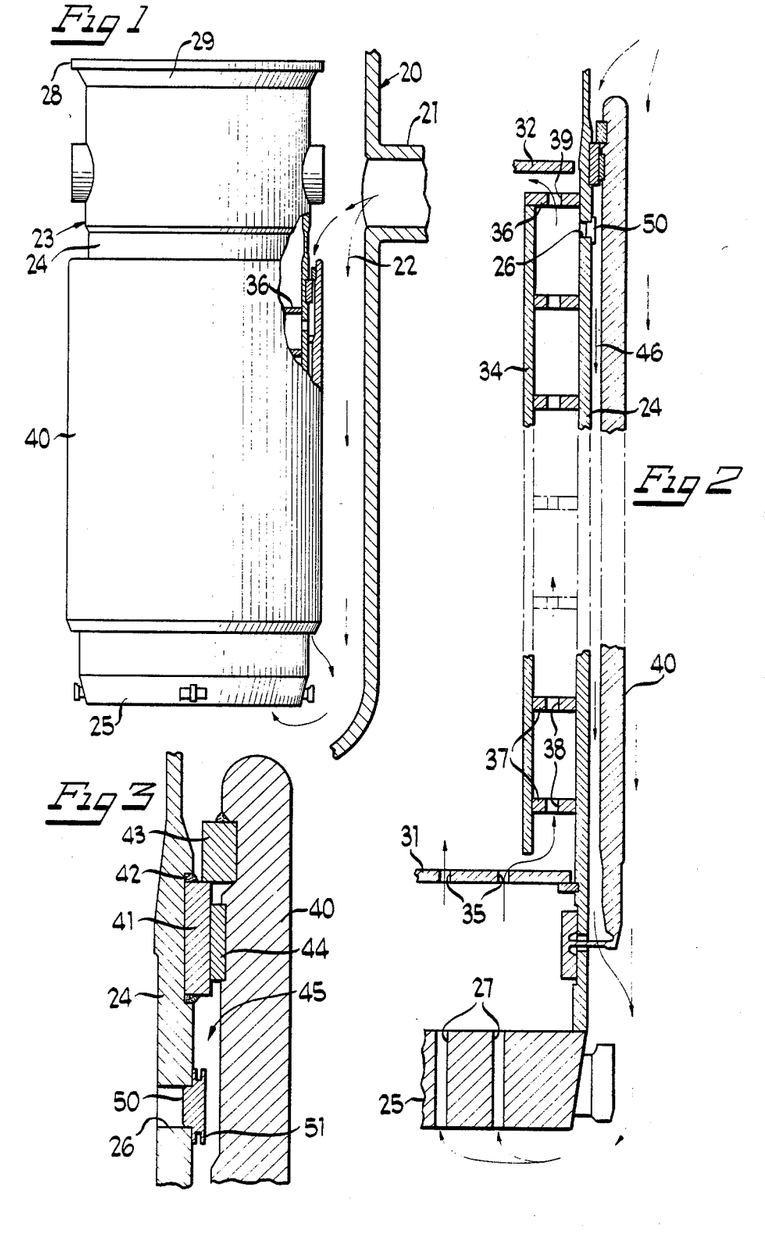
FIG. 1 is a fragmentary sectional view through a nuclear reactor illustrating the core barrel assembly in side elevation, with portions broken away.
FIG. 2 is an enlarged, fragmentary sectional view of a portion of the core barrel side wall and the thermal shield of the reactor of FIG. 1.
FIG. 3 is a further enlarged, fragmentary sectional view of the upper portion of FIG. 2.
Figure 4:
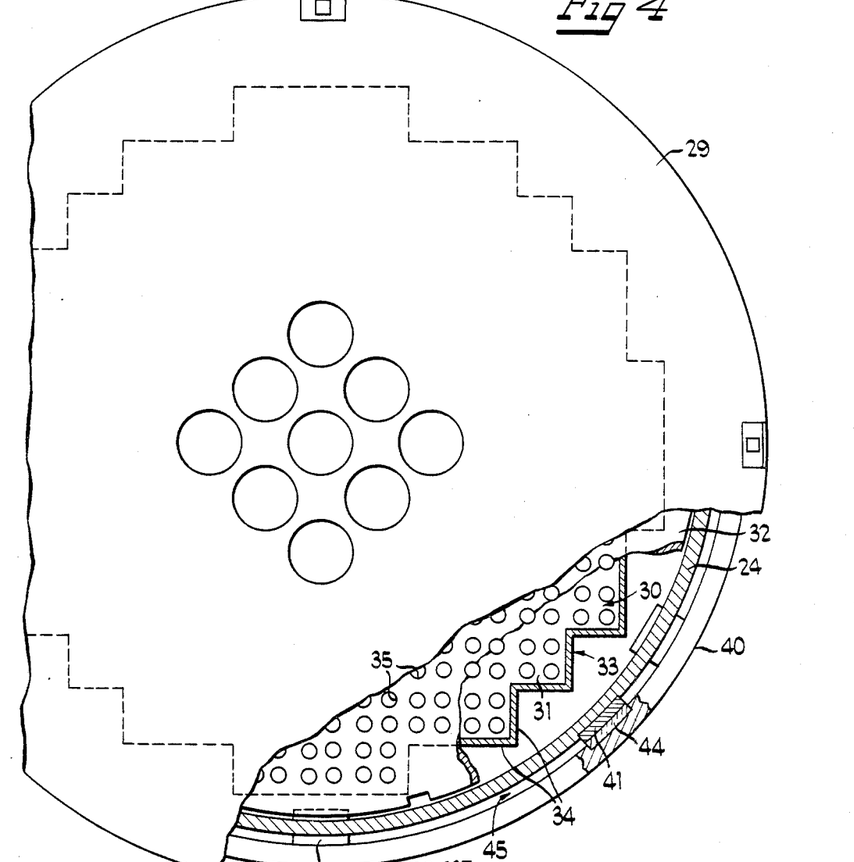
FIG. 4 is an enlarged, fragmentary top plan view of the core barrel assembly of FIG. 1, with portions broken away more clearly to show the internal construction.

In a "downflow" cooling arrangement the cooling water flows in the direction of the arrows 22 in FIG. 1, downwardly through the nuclear reactor vessel 20, flowing along the outside of the core barrel side wall 24 and inwardly through the inlet apertures 26, and then downwardly through the flow holes 38 in the former plates 37 to cool the region between the baffle 33 and the core barrel side wall 24. The water flowing down along the outside of the core barrel 23 then flows upwardly through the inlet apertures 27 in the core barrel bottom wall 25 and then upwardly through the holes 35 in the lower core plate 31 into the core assembly 30. Water flowing down between the baffle 33 and the core barrel side wall 24 flows out beneath the bottom of the baffle 33 into the core assembly 30.

In an "upflow" conversion of the reactor vessel 20, a plurality of additional circumferentially spaced-apart flow holes 39 are drilled in the top former plate 36, as illustrated in FIG. 2, while the inlet apertures 26 in the core barrel side wall 24 are plugged with plugs 50, as will be explained in greater detail below.

Disposed in surrounding relationship with the core barrel 23 coaxially therewith is a cylindrical thermal neutron shield 40. More specifically, there are fixedly secured to the core barrel side wall 24, as by weldments 42, a plurality of circumferentially spaced-apart support pads 41. Similarly there are secured, as by welding, to the inner surface of the thermal shield 40 a plurality of circumferentially spaced-apart support pads 43 and a like plurality of inserts 44, equal in number and spacing to the support pads 41 on the core barrel 23. The supports pads 43 are dimensioned to overlie and rest respectively upon the support pads 41, the inserts 44 bearing against the outer surfaces of the support pads 41, thereby securely to support the thermal shield 40 on the core barrel 23, as is best illustrated in FIG. 3. The thermal shield 40 is dimensioned so as to cooperate with the core barrel 23 to define therebetween a narrow annular space 45 which typically has a radial dimension of less than 2 inches, preferably approximately 1.5 inches.

Referring in particular to FIGS. 2 and 3, in the "downflow" conversion the cooling water flows in the direction of the arrows downwardly along the outside of the thermal shield 40 and downwardly through the annular space 45 between the thermal shield 40 and the core barrel 23, and thence upwardly through the apertures 27 in the core barrel bottom wall 25 and the holes 35 in the lower core plate 31. A portion of the water flowing through the lower core plate 31 flows directly into the core assembly 30, while a portion flows upwardly into the region between the baffle 33 and the core barrel side wall 24, flowing up through the flow holes 38 in the lower former plates 37 and the flow holes 39 in the top former plate 36 and then exiting into the core assembly 30.

The plugs 50 are preferably expandable-type plugs which are designed to securely grip the interior surfaces of the inlet apertures 26 with a force sufficient to withstand pressures within the core barrel 23 up to at least 1,750 psig. Each plug 50 has an enlarged head 51 which lies along the outer surface of the core barrel side wall 24. Each head 51 is generally circular, having a circumferential groove 52 extending therearound, and having three flattened edge portions respectively disposed along the top and sides thereof. Preferably, each plug 50 has an axial dimension slightly less than the radial dimension of the annular space 45, so as to permit insertion and removal thereof.

The plugs 50 are mounted in place by use of an insertion tool which forms no part of the present invention, but which is described herein in broad outlines because it can be used in a delivery system 55 (FIG. 5) for delivering the tool of the present invention to the vicinity of the plugs 50. More specifically, the delivery system 55 includes a mounting bracket 56 which is fixedly secured to the flange 28 of the core barrel 23. A lifting rod 57 is secured to the bracket 56 to facilitate mounting it in place. The bracket 56 projects radially outwardly beyond the edge of the flange 28 and there carries an elongated vertically disposed support tube 58 in which is reciprocatively telescopically received a delivery tube 59. The tubes 58 and 59 extend upwardly to an associated work platform (not shown) overlying the core barrel 23, the delivery tube 59 having a length sufficient to extend downwardly to the vicinity of the plugs 50.

From time to time it may become necessary to test the plugs 50 to determine if they are properly seated in the inlet apertures 26 and are capable of withstanding the pressures developed within the core barrel 23. If a plug 50 is loose or improperly seated, it must be removed and replaced. This testing and removal process is complicated by the fact that access to the plugs 50 is available only through the narrow annular space 45. Accordingly, there is provided a plug testing and removal tool 60, constructed in accordance with and embodying the features of the present invention.

Referring now to FIGS. 5–13, the tool 60 includes an elongated, flat, thin leg 61 provided at one end thereof with a thin rectangular foot 62 extending therefrom generally coplanar therewith and substantially normal to the longitudinal axis thereof. The leg 61 and the foot 62 are each substantially plate-like in shape, having a thickness substantially less than the radial width of the annular space 45. Formed in the side edge of the leg 61 which adjoins the foot 62 is an elongated channel 63.

A coupling block 64 (FIGS. 8 and 9) is secured by fasteners 65 to one face of the leg 61 adjacent to the end thereof opposite the foot 62. Integral with the coupling block 64 and projecting therefrom away from the leg 61 and generally normal thereto is a cylindrical tube 66. A short arm 67 has an annular end 67a on which is disposed a coaxial short tubular hub 68 dimensioned to be telescopically received in the distal end of the tube 66. The diameter of the annular end 67a is substantially greater than that of the hub 68, so that the end 67a abuts against the distal end of the tube 66 and is fixedly secured thereto, as by a weldment 69.

Figures 8, 9:
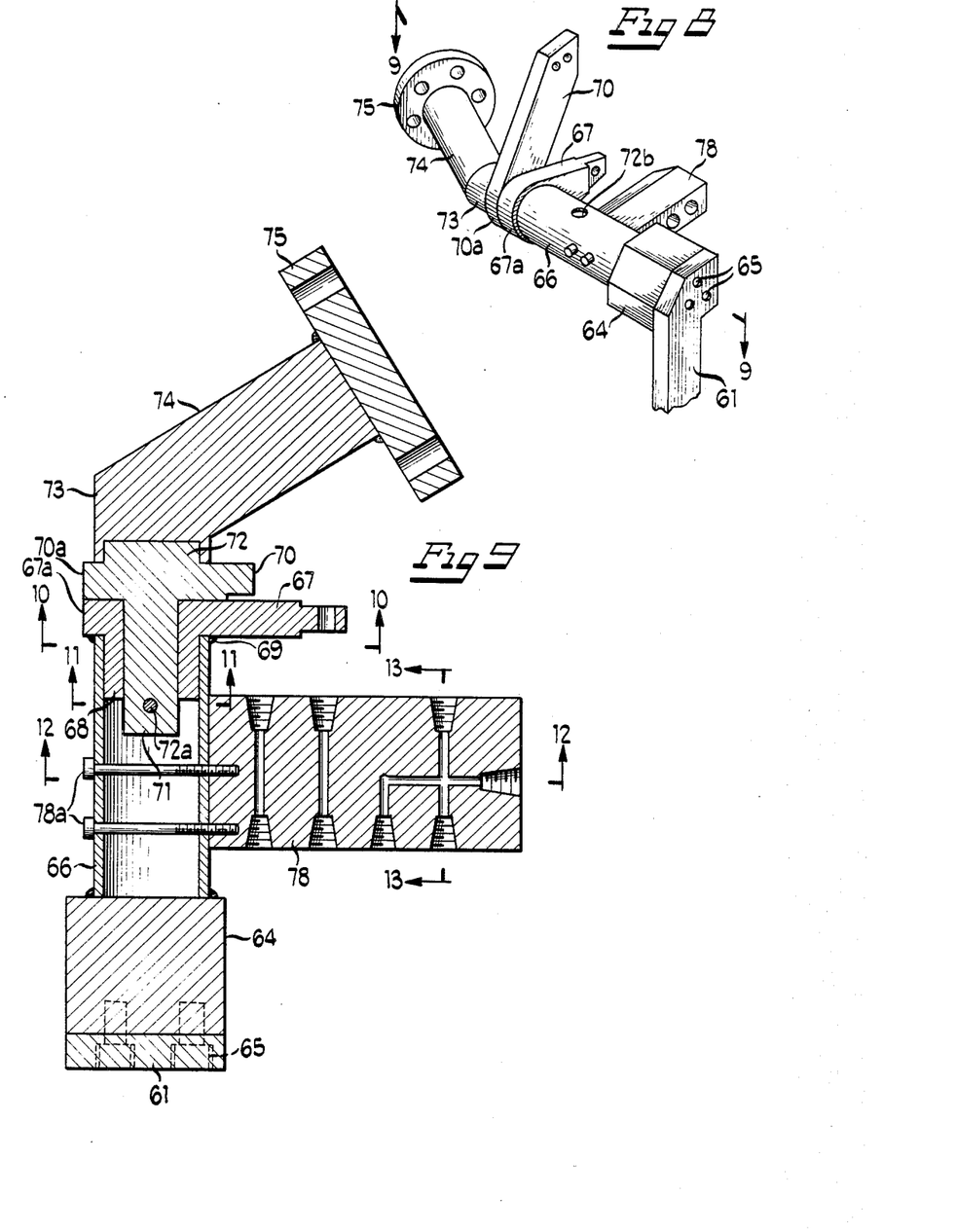
FIG. 8 is an enlarged, fragmentary, perspective view of a portion of the tool of FIG. 5, rotated about 180° counterclockwise.
FIG. 9 is a further enlarged view in horizontal section taken along the line 9—9 in FIG. 8.
Figures 10, 11:
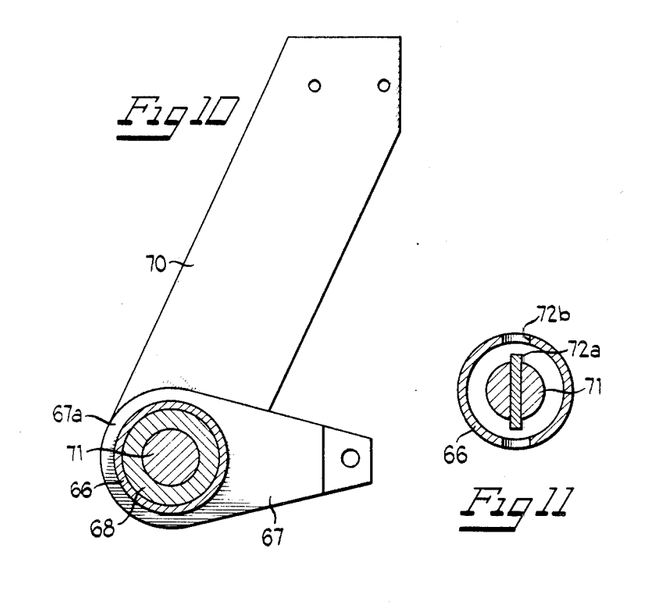
FIG. 10 is a view in vertical section taken along the line 10—10 in FIG. 9.
FIG. 11 is a view in vertical section taken along the line 11—11 in FIG. 9.
Figures 12, 13:
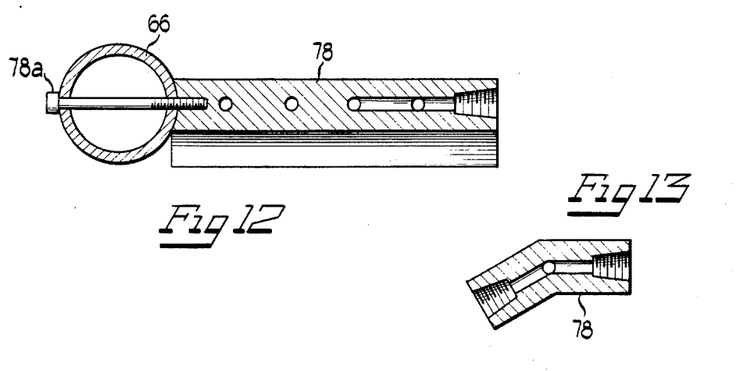
FIG. 12 is a view in vertical section taken along the line 12—12 in FIG. 9.
FIG. 13 is a view in vertical section taken along the line 13—13 in FIG. 9.

There is also provided a longer arm 70 having a circular end 70a. Integral with the end 70a and coaxial therewith are a cylindrical shaft 71 which projects from one side thereof and a short cylindrical hub 72 which projects from the opposite side thereof. The shaft 71 is telescopically received through the annular end 67a and the tubular hub 68 of the arm 67 and into the tube 66. A roll pin 72a is received through a complementary bore adjacent to the distal end of the shaft 71. The roll pin 72a has a length less than the inner diameter of the tube 66, an access hole 72b being provided in the tube 66 to permit insertion and removal of the roll pin 72a. It will be appreciated that the roll pin 72a prevents withdrawal of the shaft 71 from the tube 66, while permitting rotation of the tube 66 with respect to the shaft 71. The hub 72 of the arm 70 is telescopically received in a tubular section 73 and is fixedly secured thereto as by welding. The tubular section 73 is in turn fixedly secured to a tubular section 74 which has an axis inclined at a predetermined angle to the axis of the tubular section 73. The tubular section 74 is fixedly secured to a circular mounting plate 75 which is adapted to be secured, as by fasteners 76, to an associated plate at the lower end of the delivery system 55 for support thereby.

A push-pull cable 77 is reciprocatively disposed in a sheath 77a which extends downwardly from the upper end of the delivery system 55 to the upper end of the plug testing and removal tool 60. More specifically, the sheath 77a is secured to the arm 70, and the distal end of the cable 77 is secured to the arm 67. It will be appreciated that reciprocation of the cable 77 will effect a pivotal movement of the arm 67, thereby effecting a corresponding pivotal movement of the leg 61 about the axis of the tube 66. Fixedly secured to the tube 66 and projecting radially therefrom is a hydraulic manifold 78 provided with a plurality of fittings 79 for coupling hydraulic conduits in the manner to be described more fully below.

The tool 60 includes a gripper assembly 80 which is carried by the foot 62. More specifically, the gripper assembly 80 includes a fixed jaw plate 81 which is a thin, flat member having a recess along one edge thereof which defines a short flange 82 disposed in use in overlapping relationship with a corresponding flange 83 on the adjacent edge of the foot 62. A rectangular spacer insert 84 is sandwiched between the flanges 82 and 83, the parts all being secured together with a plurality of fasteners 85. The surface 83a (FIG. 18) of the flange 83 which abuts the spacer insert 84 is angularly disposed with respect to the main planar surfaces of the foot 62, so that when the flanges 82 and 83 are joined to the spacer insert 84, the foot 62 will be tilted at a predetermined small angle "A" with respect to the fixed jaw plate 81 (see FIG. 18). Formed along the upper edge of the jaw plate 81 adjacent to the flange 82 is a rectangular notch 86 in which is mounted a fitting 87 which couples one end of a hydraulic conduit 88 to the jaw plate 81, the other end of the conduit 88 extending upwardly through the channel 63 and being coupled to one of the fittings 79 on the hydraulic manifold 78.

The fixed jaw plate 81 is adapted to be coupled to a movable jaw plate 90. More specifically, there is integral with the fixed jaw plate 81 at the side thereof opposite the flange 82 an elongated pivot arm 89 which extends between the legs of a clevis portion 91 of the movable jaw plate 90 and is coupled thereto by a pivot pin 92 which accommodates pivotal movement of the jaw plate 90 with respect to the jaw plate 81 between a closed or gripping position illustrated in solid line in FIG. 6, and an open position illustrated in broken line in FIG. 6. The movable jaw plate 90 is a flat plate-like member which has a thickness comparable to that of the fixed jaw plate 81 and is disposed with the front and rear surfaces thereof substantially coplanar with those of the jaw plate 81. The facing edges of the jaw plates 81 and 90 are cut away to define recesses which are generally complementary to the head 51 of a plug 50. More specifically, each of the jaw plates 81 and 90 has a flat vertical surface 93 for engaging a corresponding one of the flat portions along the sides of a plug head 51, the fixed jaw plate 81 also having a flat top surface 94 disposed to engage the top flat portion along the top of the plug head 51. The facing edges of the jaw plates 81 and 90 are provided at their lower ends, respectively, with sharp, spaced-apart tips 95.

The recessed edge of each of the jaw plates 81 and 90 is also provided with a pair of arcuate gripping flanges 96 disposed adjacent to the front face of the jaw plate and a pair of arcuate retaining flanges 97 disposed adjacent to the rear face of the jaw plate. More particularly, on each of the jaw plates 81 and 90, one of the gripping flanges 96 and one of the corresponding retaining flanges 97 extend from the tip 95 to one end of the flat surfaces 93, while the other one of the gripping flanges 96 and the corresponding retaining flange 97 extend from the other end of the flat surface 93 to the flat surface 94. Thus, referring in particular to FIGS. 14 and 15, when the gripper assembly 80 is disposed in its closed position illustrated in FIG. 6, the jaw plates 81 and 90 are disposed for gripping engagement with an associated plug head 51, as will be explained in greater detail below.

The front face of each of the jaw plates 81 and 90 is provided with a pair of vertically spaced-apart internally-threaded cylindrical recesses 100, each of the recesses 100 having an enlarged-diameter counterbore portion 101 (see FIG. 7) which cooperates with the internally threaded portion of the recess 100 to define therebetween an annular shoulder 102. Communicating with each of the recesses 100 is a short spur passage 103 bored in the associated jaw plate 81 or 90 and extending laterally outwardly therefrom for communication with an elongated vertical passage 104. The vertical passage 104 in the jaw plate 81 communicates with the fitting 87, while the vertical passage 104 in the movable jaw plate 90 communicates with a fitting 107 which is fixedly secured to the jaw plate 90 in a rectangular notch 105 at the upper end thereof. The fitting 107 is in turn connected to one end of a conduit 108 which extends upwardly through the channel 63 in the leg 61 to one of the fittings 79 on the hydraulic manifold 78.

Integral with the movable jaw plate 90 at the upper end thereof and extending upwardly therefrom is an arm 109 adapted to be coupled to a drive assembly 110 for effecting pivotal movement of the movable jaw plate 90 between its open and closed positions. More specifically, the drive assembly 110 includes a base plate 111 which is fixedly secured to the upper edge of the foot 62. Integral with the base plate 111 and extending upwardly therefrom is a clevis arm 112 which is pivotally coupled at its upper end, as by a pivot pin 113, to one end of a hydraulic, double-action cylinder 114, which includes a movable piston having a piston rod 115 projecting from the other end of the cylinder 114. The distal end of the piston rod 115 carries a coupler 116 which is pivotally coupled, as by a pivot pin 117, to the distal end of the arm 109. Hydraulic fittings 118 are mounted on the cylinder 114 adjacent to the opposite ends thereof and are respectively coupled to hydraulic conduits 119 for supplying hydraulic fluid to the opposite sides of the piston. The conduits 119 extend upwardly through the channel 63 in the leg 61 to corresponding ones of the fittings 79 on the hydraulic manifold 78. It will be appreciated that the hydraulic manifold 78 is in turn coupled by associated conduits (not shown) to a work station disposed adjacent to the upper end of the delivery system 55, where suitable control valves (not shown) are provided to control the flow of hydraulic fluid through the conduits 88, 108 and 119.

Figure 7:
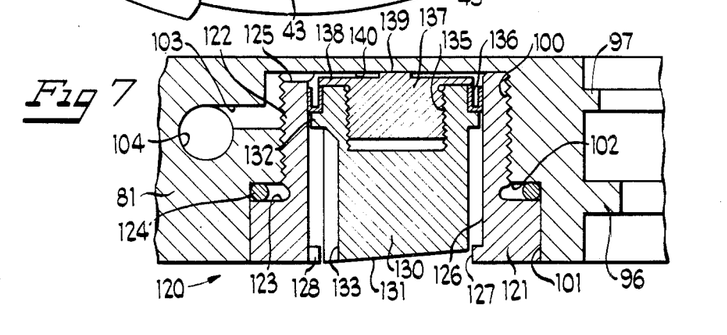
FIG. 7 is a further enlarged, fragmentary view in horizontal section taken along the line 7—7 in FIG. 6.

Respectively disposed in the recesses 100 of the jaw plates 81 and 90 are four single-action, plug-pulling piston assemblies 120, which are substantially identical in construction, wherefore only one will be described in detail. More specifically, each of the piston assemblies 120 includes a hollow cylinder 121 having a reduced-diameter, externally threaded portion 122 at one end thereof which is disposed for threaded engagement in the corresponding recess 100. The reduced-diameter portion 122 cooperates with the main portion of the cylinder 121, which is disposed for seating in the counterbore portion 101 of the recess 100, to define an annular shoulder 123 which cooperates with the shoulder 102 in the recess 100 to trap therebetween an O-ring seal 124. The parts are so dimensioned that when the cylinder 121 is completely threaded into the recess 100, the outer face of the cylinder 121 will be substantially flush with the front face of the corresponding jaw plate 81 or 90, as is best illustrated in FIG. 7.

The end surface of the reduced-diameter portion 122 is undercut to define a radial port 125 which is positioned for communication with the spur passage 103 when the cylinder 121 is completely threaded into the recess 100. The inner surface of the cylinder 121 is counterbored from its inner end, as at 126, to form an annular flange or shoulder 127 at the front or outer end of the cylinder 121, the flange 127 being notched to form a keyway 128 therethrough. Formed in the front face of the cylinder 121 at diametrically spaced-apart locations thereon are two holes 129 for receiving an associated spanner wrench (not shown) to facilitate screwing the cylinder 121 into and out of the recess 100.

Disposed in the cylinder 121 is a solid cylindrical piston 130 having a front or outer face 131 which is beveled so as to be generally complementary with the outer surface of the core barrel side wall 24 in use, as will be explained in greater detail below. The piston 130 is provided adjacent to its opposite end with a radially outwardly extending annular retaining flange 132. It will be appreciated that the piston 130 has a diameter slightly less than the inner diameter of the flange 127 to permit free sliding movement of the piston 130 with respect to the cylinder 121, the diameter of the retaining flange 132 being greater than the inner diameter of the flange 127 for cooperation therewith to limit the outward travel of the piston 130. Formed in the outer surface of the piston 130 is a longitudinally extending slot 133 in which is press-fitted an elongated key 134 disposed to be received in the keyway 128 to prevent rotational movement of the piston 130 about its axis.

Formed in the rear or inner end of the piston 130 is an internally-threaded axial bore 135. An annular flexible seal 136, generally U-sahped in transverse cross section, is disposed between the piston 130 and the cylinder 121 rearwardly of the flange 132 to provide a fluid-tight seal between the piston 130 and the cylinder 121. A retaining plug 137 is threadedly engaged in the bore 135 and is provided with a radially outwardly extending annular flange 138 which overlaps the inner wall of the seal 136 at the rear end thereof and cooperates with the flange 132 to retain the seal 136 therebetween. Projecting rearwardly from the plug 137 centrally thereof is a short stop lug 139 which is disposed for engagement with the bottom of the recess 100 to space the flange 138 therefrom to define a fluid channel 140, thereby to permit hydraulic fluid to flow to the rear surface of the flange 138 and the piston 130 to drive the piston 130 forwardly, in a known manner.

Figures 5, 6, 18:
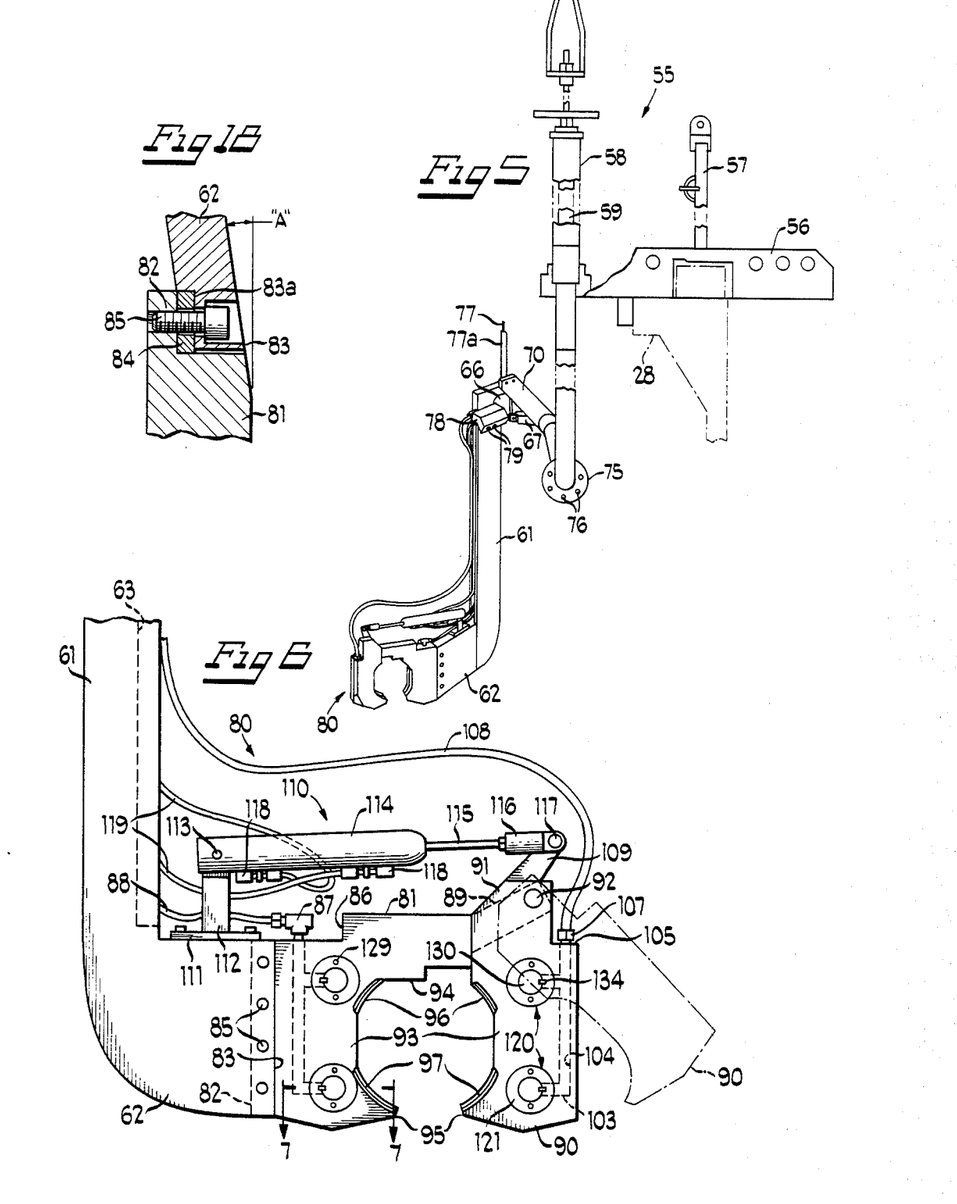
FIG. 5 is an enlarged, perspective view of the plug testing and removal tool of the present invention, illustrating apparatus for insertion of same into the core barrel assembly.
FIG. 6 is a further enlarged, fragmentary, side elevational view of the jaw mechanism of the tool of FIG. 5, illustrating the movement thereof.
FIG. 18 is a further enlarged, fragmentary view of a portion of FIG. 16, illustrating the spacer insert.

In operation, when it is desired to test a plug 50, the tool 60 is inserted downwardly into the annular space 45 between the core barrel 23 and the thermal shield 40 from the top thereof, between adjacent ones of the support pads 41. This lowering is effected by use of the delivery system 55, as illustrated in FIG. 5, the tool 60 being lowered from a work platform (not shown) disposed above the reactor vessel 20. However, it will be appreciated that any type of elongated device could be utilized for lowering the tool 60 into place. In this regard, it will be noted that the thickness of the tool 60 is such that it fits easily between the core barrel 23 and the thermal shield 40. The predetermined angle A between the foot 62 and the fixed jaw plate 81, which is typically a few degrees, is set so that the tool 60 will generally follow the curvature of the core barrel side wall 24. It will be appreciated that, before insertion of the tool 60, it is placed in an initial condition with the gripping assembly 80 in its closed position and with all of the pistons 130 in their fully retracted positions. The tool 60 is then lowered into the proper position in the annular space 45 by use of the delivery system 55. A TV camera may be provided in the annular space 45 to guide the tool 60 into place. In this manner, the tool 60 is remotely guided into position over the plug 50 to be tested.

Figure 14:
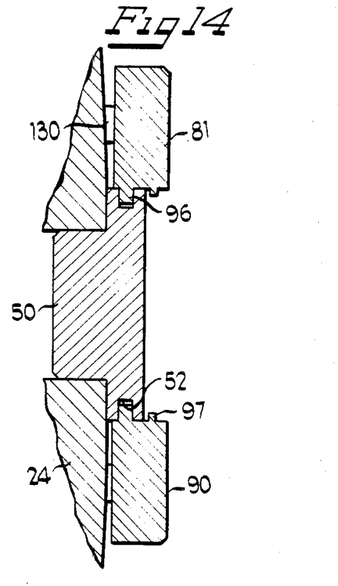
FIG. 14 is an enlarged, fragmentary view in horizontal section illustrating use of the tool of the present invention in testing of a plug.
Figure 15:
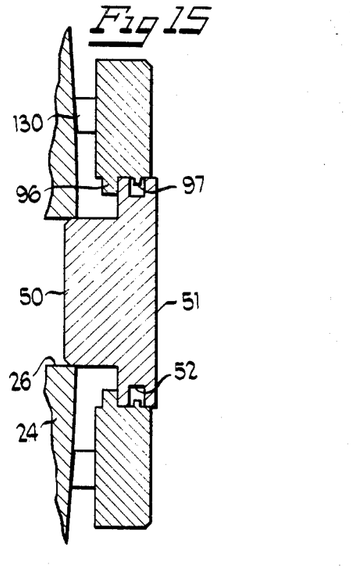
FIG. 15 is a view similar to FIG. 14 illustrating use of the tool of the present invention in removal of the plug.

The gripper assembly 80 is then moved to the open position by operation of the drive assembly 110. Preferably, the cylinder 114 is coupled to a relatively low pressure hydraulic system which may be pressurized by a hand pump (not shown), suitable valving at the work station being provided to control the flow of fluid to the cylinder 114. The tool 60 is positioned with the plug head 51 disposed between the jaw plates 81 and 90, the front surfaces of the jaw plates 81 and 90 being disposed toward the outer surface of the core barrel side wall 24. The gripping flanges 96 of the fixed jaw plate 81 are positioned in the groove 52 of the plug head 51, as indicated in FIG. 14.

The rotational position of the gripping assembly 80 with respect to the axis of the plug 50 may be adjusted in order to obtain the proper fitting of the gripping flanges 96 in the groove 52 by the manipulation of the push-pull cable 77 to effect rotation of the leg 61 about the axis of the tube 66 which is preferably generally perpendicular to the plane of the fixed jaw plate 81. When the fixed jaw plate 81 has thus been accurately positioned on the plug head 51, the movable jaw plate 90 is moved to its closed or gripping position by operation of the drive assembly 110, into engagement with the opposite side of the plug head 51 with the gripping flanges 96 on the movable jaw plate 90 being received in the groove 52, as illustrated in FIG. 14. When thus locked into place in gripping engagement with the plug head 51, the retaining flanges 97 will be disposed along the outer surface of the plug head 51.

The pulling piston assemblies 120 are now actuated to their pulling or tensioning conditions. More specifically, pressurized hydraulic fluid is applied to the fluid channels 140 through the conduits 88 and 108 from an associated relatively high pressure hydraulic system, which may also be operated by a hand pump at the associated work station. More specifically, the hydraulic fluid flows through the passages 104 and the spur passages 103, through the undercut ports 125 in the cylinders 121 into the fluid channels 140, thereby driving the pistons 130 forwardly into engagement with the core barrel side wall 24, as indicated in FIG. 14. The beveled faces 131 of the pistons 130 permit them to be engaged substantially tangent to the core barrel side wall 24.

Preferably, a pressure of approximately 3,500 psig is applied to the pistons 130. Thus, it will be appreciated that the pulling piston assemblies 120 cooperate with the gripper assembly 80 to exert on the plug head 51 a pulling force of about 6,000 lbs. axially of the plug 50, i.e., in a direction radially outwardly of the core barrel 23. During this tensioning operation, the plug 50 is monitored. This may be done with the associated vision system, but more accurate monitoring is effected by recording the hydraulic pressure on the pulling piston assemblies 120. Specifically, the pressure on the pulling piston assemblies 120 is gradually increased and is carefully recorded. The pressure is increased until it reaches approximately 3,500 psig. Any movement of the plug 50 will be attended by a rapid decrease in pressure. If after the system has been pressurized to about 3,500 psig, no movement of the plug 50 has been detected, it is assumed to have been properly installed, and the tool 60 may be removed from the plug head 51 and moved to the next plug 50 to be tested.

If, however, the plug 50 begins to move before a pressure of 3,500 psig is reached, then it has been improperly installed and must be removed and replaced. Accordingly, pressurization of the piston assemblies 120 is continued, resulting in continued movement of the plug 50 radially outwardly from the inlet aperture 26. This outward movement of the plug 50 will continue until the pistons 130 have reached the limit of their travel, with the flanges 132 in engagement with the flanges 127. This point will be attended by a sharp increase in the pressure on the piston assemblies 120.

The pressure is then relieved in the pulling piston assemblies 120, and the gripper assembly 80 is moved to its open position. The tool 60 is then moved away from the plug 50 a slight distance and the gripper assembly 80 is moved against the core barrel side wall 24 to push the pistons 130 back to their retracted positions. If necessary, the tool 60 can be removed from the space 45 to retract the pistons 130 by hand, if they should not be fully retracted by engagement with the core barrel side wall 24. The gripping assembly 80 is then repositioned over the plug head 51 in the position illustrated in FIG. 15, with the retaining flanges 97 received in the groove 52 and with the gripping flanges 96 disposed along the inner surface of the plug head 51. The movable jaw plate 90 is then moved back to its closed gripping position. It will be appreciated that this repositioning of the gripper assembly 80 moves the front faces of the jaw plates 81 and 90 closer to the core barrel side wall 24. The pulling piston assemblies 120 are then again pressurized to move the pistons 130 back into engagement with the core barrel side wall 24 to continue exerting removal force on the plug 50 until it has been completely removed from the inlet aperture 26. This point can be recognized by a sharp drop in pressure, free movement of the tool 60 in its mount and visible clearance between the plug 50 and the core barrel 23. The retaining flanges 97 serve to hold the plug 50 firmly in the grasp of the gripper assembly 80 and prevent it from being ejected out the rear faces of the jaw plates 81 and 90 when the plug 50 is freed. This prevents the plug 50 from coming loose and falling to the bottom of the reactor vessel 20.

When the plug 50 has thus been removed, the tool 60, with the plug 50 securely gripped therein, is removed from the annular space 45 to retrieve the plug 50. The tool 60 may then be repositioned over the next plug 50 to be tested, in the manner described above.

Figure 16:
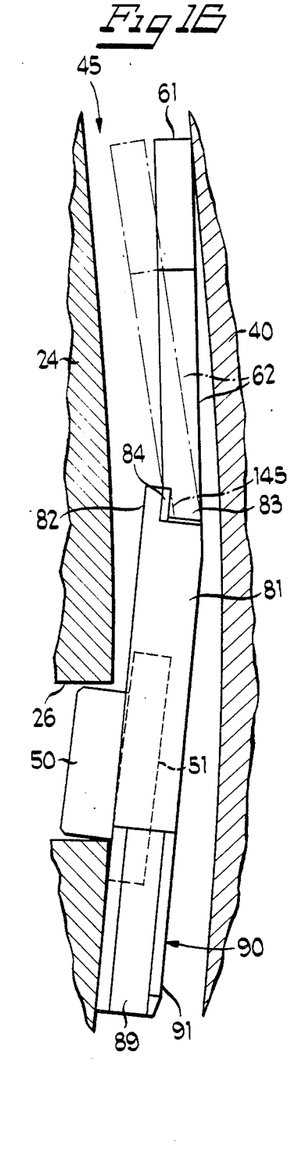
FIGS. 16 and 17 are enlarged fragmentary views in horizontal section illustrating use of a substitute spacer insert to alter of the mounting angle of the jaws of the tool of FIG. 5 for application to mis-aligned plugs.
Figure 17:
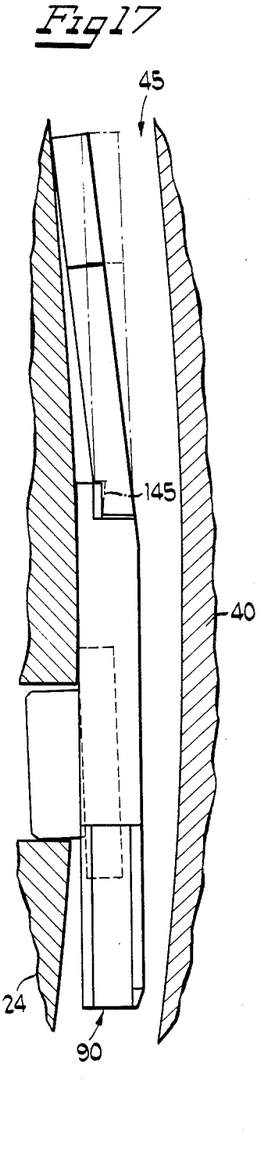

Referring now also to FIGS. 16–18, on occasion, a plug 50 will be misaligned in the inlet aperture 26 so as not to be exactly coaxial therewith. In this case, the plug head 51 may be slightly tilted so as to be tangent to the core barrel side wall 24 at a point spaced from the axis of the inlet aperture 26. In this event, when the gripper assembly 80 is properly positioned on the plug head 51, the narrow clearance afforded by the annular space 45 may be insufficient to permit the necessary movement of the gripper assembly 80 during the plug removal operation, as indicated in FIGS. 16 and 17. For this purpose, there has been provided an auxiliary spacer insert 145 which, instead of being rectangular in transverse cross section, is somewhat wedge-shaped, being narrower at one side edge than at the other. This auxiliary spacer 145 may be substituted for the standard spacer insert 84 to change the angle between the leg 61 and the jaw plates 81 and 90.

When the spacer insert 145 is inserted with the thick edge thereof toward the fixed jaw plate 81, the angle A will be increased to cant the leg 61 and the foot 62 toward the core barrel side wall 24 when the gripper assembly 80 is disposed in gripping engagement with the plug head 51, as illustrated in FIG. 16. This will accommodate the necessary plug-removal movement of the gripper assembly 80 when the plug 50 is tilted in the manner illustrated in FIG. 16. When the spacer insert 145 is inserted with its narrow end toward the fixed jaw plate 81, the angle A will be decreased, to cant the leg 61 and the foot 62 away from the core barrel side wall 24 when the gripper assembly 80 is disposed in gripping engagement with the plug head 51, as illustrated in FIG. 17. This will accommodate the necessary plug-removal movement of the gripper assembly 80 when the plug 50 is tilted in the manner illustrated in FIG. 17.

There has been described above what may be referred to as a "left-hand" version of the plug testing and removal tool 60, i.e., a version in which the gripper assembly 80 projects from the leg 61 to the left, as viewed in FIG. 5. The plug testing and removal tool 60 may also be provided in a "right-hand" version (not shown), which is a mirror image of the "left-hand" version. The use of both versions may be necessary to access all of the plugs 50 in the core barrel 23.

From the foregoing, it can be seen that there has been provided a unique tool for testing and removal of plugs from apertures in the cylindrical core barrel wall of a nuclear reactor, which tool is uniquely shaped to fit into the narrow annular space between the core barrel and a surrounding thermal shield, while still accommodating development of the necessary high pulling forces to effectively test and, if necessary, remove the plug.

We claim as our invention:

1. Apparatus for testing and removing a plug from an aperture in the cylindrical core barrel wall of a nuclear reactor, wherein the plug has an enlarged head disposed along the wall in a narrow annular access space between the wall and a surrounding cylindrical thermal shield, said apparatus comprising: gripping means receivable in said access space for gripping the plug head, and tensioning means coupled to said gripping means and receivable therewith in said access space and engageable with the core barrel wall for exerting on said gripping means and the gripped plug a predetermined force in a direction radially outwardly of the core barrel wall, said gripping means and said tensioning means having dimensions radially of the wall substantially less than the radial thickness of the access space.

2. The apparatus of claim 1, wherein said gripping means and said tensioning means are fluid driven.

3. The apparatus of claim 1, wherein said gripping means comprises two gripping jaws adapted for relative movement between gripping and releasing conditions.

4. The apparatus of claim 1, wherein said tensioning means comprises fluid-actuated piston means movable to an extended position for engagement with the core barrel wall.

5. The apparatus of claim 4, wherein said tensioning means comprises a plurality of said piston means disposed in use around the plug head.

6. Apparatus for testing and removing a plug from an aperture in the cylindrical core barrel wall of a nuclear reactor, wherein the plug has an enlarged head disposed along the wall in a narrow annular access space between the wall and a surrounding cylindrical thermal neutron shield, said apparatus comprising: fixed jaw means, movable jaw means pivotally connected to said fixed jaw means for movement with respect thereto between an open position accommodating reception of the plug head between said fixed and movable jaw means and a closed position for securely gripping the plug head between said fixed and movable jaw means, drive means carried by said fixed jaw means and coupled to said movable jaw means for effecting movement thereof between the open and closed positions thereof, and tensioning means carried by said jaw means for engagement with the core barrel wall when said jaw means are disposed in gripping engagement with the plug head for exerting on said jaw means and the gripped plug a predetermined force in a direction radially outwardly of the wall, said jaw means and said drive means and said tensioning means all having dimensions radially of the wall substantially less than the radial thickness of the access space to permit insertion into, movement within and removal from the access space.

7. The apparatus of claim 6, wherein said fixed and movable jaw means respectively include flat plate-like jaw members disposed in use in substantially coplanar relationship, and further including an elongated flat plate-like insertion member fixedly secured at one end thereof to said fixed jaw member with the plane of said insertion member inclined at a predetermined small angle with respect to the plane of said jaw members.

8. The apparatus of claim 7, and further including means for selectively varying said predetermined angle.

9. The apparatus of claim 6, wherein said drive means includes a fluid-actuated drive cylinder.

10. The apparatus of claim 6, wherein said fixed and movable jaw means respectively include flat plate-like jaw members disposed in use in substantially coplanar relationship, said movable jaw member being pivotally movable about a first axis disposed substantially perpendicular to the plane of said jaw members.

11. The apparatus of claim 10, and further including means for effecting pivotal movement of said fixed jaw member about a second axis disposed substantially perpendicular to the plane thereof.

12. The apparatus of claim 6, wherein said tensioning means includes fluid-actuated piston means movable to an extended position for engagement with the core barrel wall.

13. The apparatus of claim 6, wherein the plug head has a radial groove extending therearound, each of said jaw means including an arcuate gripping flange adapted to be received in said groove when said jaw means are disposed in the closed position thereof.

14. The apparatus of claim 13, wherein each of said jaw means includes an arcuate retaining flange spaced from said gripping flange for cooperation therewith to constrain the plug against axial movement relative to said jaw means.

15. Apparatus for testing and removing a plug from an aperture in the cylindrical core barrel wall of a nuclear reactor, wherein the plug has an enlarged head disposed along the wall in a narrow annular access space between the wall and a surrounding cylindrical thermal neutron shield, said apparatus comprising: gripping means receivable in said access space for gripping the plug head, said gripping means including a thin plate-like member having front and rear surfaces spaced apart a distance substantially less than the radial thickness of the access space and disposed in facing relationship respectively with the core barrel wall and the thermal shield when said gripping means is disposed in said access space, said plate-like member having a recess in the front surface thereof and a fluid channel disposed between said front and rear surfaces and communicating with said recess, cylinder means receivable in said recess and securely attached to said plate-like member and having a port therein providing communication between said fluid channel and the interior of said cylinder means, piston means disposed in said cylinder means for sliding movement axially thereof between a retracted position withdrawn completely into said plate-like member and an extended position projecting outwardly beyond said front surface of said plate-like member, and means for applying pressurized fluid to said fluid channel to drive said piston means to the extended position thereof for engagement with the core barrel wall when said gripping means is disposed in gripping engagement with the plug head to exert on said gripping means and the gripped plug a predetermined force in a direction radially outwardly of the wall.

16. The apparatus of claim 15, and further including a plurality of said cylinder means and said piston means.

17. The apparatus of claim 15, wherein said piston means has an outer surface beveled substantially to complement the curvature of the core barrel wall.

18. The apparatus of claim 17, and further including means preventing rotation of said piston means about its axis.

19. The apparatus of claim 15, and further including retaining means for limiting the axial movement of said piston means.

20. The apparatus of claim 15, wherein said gripping means includes two jaw members adapted for relative movement between releasing and gripping positions.

* * * * *